(12) United States Patent
Harding (10) Patent No.: US 6,232,982 B1
(45) Date of Patent: May 15, 2001

(54) ENHANCED CHRONOLOGICAL FEATURE BROWSER FOR COMPUTER AIDED DESIGN

(75) Inventor: Muir Lee Harding, Tualatin, OR (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/074,552

(22) Filed: May 7, 1998

(51) Int. Cl.$^7$ ........................................ G06T 11/00
(52) U.S. Cl. ...................... 345/433; 706/919; 707/502
(58) Field of Search ....................... 345/433, 718; 706/919; 707/502; 364/474.24; 395/919

(56) References Cited

U.S. PATENT DOCUMENTS

| | | | |
|---|---|---|---|
| 4,870,397 | * | 9/1989 | Soto et al. ............................ 340/747 |
| 5,444,836 | * | 8/1995 | Hollingsworth et al. ............ 395/135 |
| 5,465,324 | * | 11/1995 | Lee et al. .............................. 395/133 |
| 5,485,390 | * | 1/1996 | LeClair et al. .................... 364/474.24 |
| 5,689,711 | * | 11/1997 | Bardasz et al. ...................... 395/701 |

\* cited by examiner

Primary Examiner—Matthew Luu
Assistant Examiner—G. F. Cunningham
(74) Attorney, Agent, or Firm—Columbia IP Law Group, LLP (57) ABSTRACT

An enhanced chronological feature browser for computer aided design indicates dependencies among features of an object, including identifying a feature of the object for which a logical dependency is to be displayed and augmenting a chronological feature display with an indicator of the logical dependency.

22 Claims, 6 Drawing Sheets

ENHANCED CHRONOLOGICAL FEATURE BROWSER FOR COMPUTER AIDED DESIGN

BACKGROUND OF THE INVENTION

1. Field of the Invention

The present invention pertains to the field of computer aided design. More particularly, this invention relates to an enhanced chronological feature browser for computer aided design.

2. Background

As technology has advanced, computer systems have become more and more commonplace in a wide variety of home and business environments. One use of such computer systems is for computer aided design (CAD) applications which allow users to design various products in varying degrees of detail.

One type of CAD application is referred to as feature-based CAD or parametric CAD. In feature-based CAD, objects are created by identifying multiple features and defining relationships or dependencies among those features. A feature refers to one or more lines of an object. For example, one feature may identify a cube and a second feature may identify a hole, while a relationship between the features indicates where in the surface the hole occurs.

Feature-based CAD programs typically provide a "feature browser" display that identifies to the user the chronological and hierarchical dependencies among features. The chronological dependencies identify an ordering of the display of features of an object during the actual displaying of the object (e.g., the hole should be displayed after the surface in the above example to ensure that the surface doesn't cover the hole). The hierarchical dependencies identify which features are part of which other features (e.g., an object may include multiple surfaces and multiple holes, each of which are a part of the feature).

However, additional dependencies, referred to as "logical" dependencies, can also exist among features. As used herein, "logical" dependencies refer to non-chronological and non-hierarchical relationships between two or more features. Examples of logical dependencies include parameters which are shared among two or more features, and constraints which identify positional relationships between features (e.g., two lines are to be parallel, two features are to share an edge, etc.). However, typical prior art CAD applications do not provide a method for identifying logical dependencies which are easily readable by a user.

Thus, a need exists for an enhanced chronological feature browser for CAD systems.

SUMMARY OF THE INVENTION

An enhanced chronological feature browser for computer aided design is described herein. The enhanced browser indicates dependencies among features of an object, including identifying a feature of the object for which a logical dependency is to be displayed and augmenting a chronological feature display with an indicator of the logical dependency.

According to one aspect, the augmenting comprises overlaying a directional arrow indicating the logical dependency on an indicator of the chronological feature display.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

Figure 1:
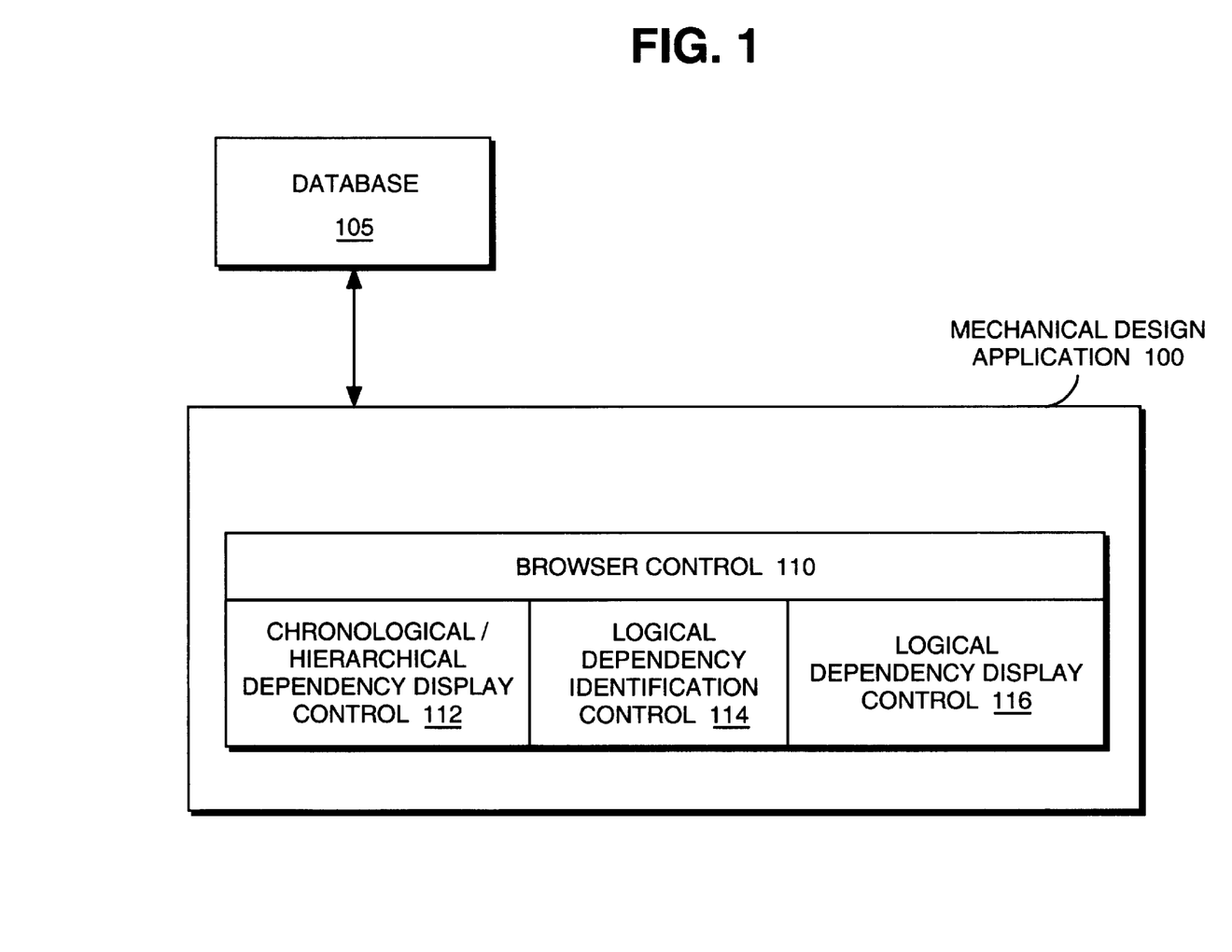
FIG. 1 is a block diagram illustrating a mechanical design application incorporating the enhanced chronological feature browser of the present invention.

FIG. 1 is a block diagram illustrating a mechanical design application incorporating the enhanced chronological feature browser of the present invention. In the illustrated embodiment mechanical design application 100 is a feature-based or parametric computer-aided design (CAD) application. Design application 100 maintains database 105, which stores the design information for use by application 100. This design information includes the various features of objects as well as the dependencies among those features. Except for the teachings of the present invention incorporated in browser control 110, mechanical design application 100 is intended to represent a broad range of mechanical design software known in the art, including but not limited to AutoCAD® and Mechanical Desktop®, both available from Autodesk, Inc., of San Rafael, Calif.

Design application 100 also includes one or more solvers (not shown). The solvers are used to resolve the various features of the design. As is known to those skilled in the art, feature-based or parametric CAD applications define relationships among the various features of an object, so that the specific positioning of a particular feature within the object is often dependent on at least one other feature. Situations can arise, however, where a particular feature cannot be resolved. This can occur, for example, in situations where the user has made an error in defining a feature.

Design application 100 includes browser control 110 as shown. Browser control 110 provides a display of the chronological and hierarchical dependencies of an object(s) stored in database 105, augmented with the display of logical dependencies in accordance with the present invention. Browser control 110 includes chronological/hierarchical display control 112, dependency identification control 114, and dependency display control 116.

Chronological/hierarchical display control 112 controls the display of chronological and hierarchical dependencies for an object. According to one embodiment, chronological dependencies are indicated in a "vertical layout" manner, with "higher" features being displayed prior to "lower" features. Hierarchical dependencies, on the other hand, are indicated in a "horizontal layout" manner, with features which are part of another feature or object being displayed offset horizontally from the other feature or object. Such chronological and hierarchical layouts are well-known to those skilled in the art.

Logical dependency identification control 114 identifies logical dependencies among features stored in database 105. According to one embodiment of the present invention, the logical dependencies of a feature in database 105 are known by that particular feature. Thus, in this embodiment logical dependency identification control 114 merely inquiries a feature of database 105 in order to retrieve logical dependency information for that feature. According to an alternate embodiment of the present invention, the features of database 105 are not aware of their logical dependencies, however, the relationships between the various features of an object stored in database 105 are also stored in database 105. The data structure used for the storage of these relationships is such that the two or more features which are related are identified in the data structure along with the type of relationship (for example, chronological dependency, hierarchical dependency, or logical dependency). Thus, in this alternate embodiment, logical dependency identification control 114 identifies the logical dependency information corresponding to a particular feature by searching through these data structures of database 105 to identify relationships which include the particular feature and which define a logical dependency.

Logical dependency display control 116 provides a display of logical dependencies identified by identification control 114. Logical dependency display control 116 augments the display provided by chronological/hierarchical dependency display control 112 with additional indicators of such logical dependencies. In one implementation, these indicators are directional arrows. Various modifications to the indicators provided by display control 116 can be made in order to provide additional information to the user. By way of example, one color may be used to indicate those features from which a particular feature depends, while another color may be used to show those features which are dependent from the particular feature.

The operation of browser control 110 will be further discussed in more detail below with reference to the following figures.

Figure 2A:
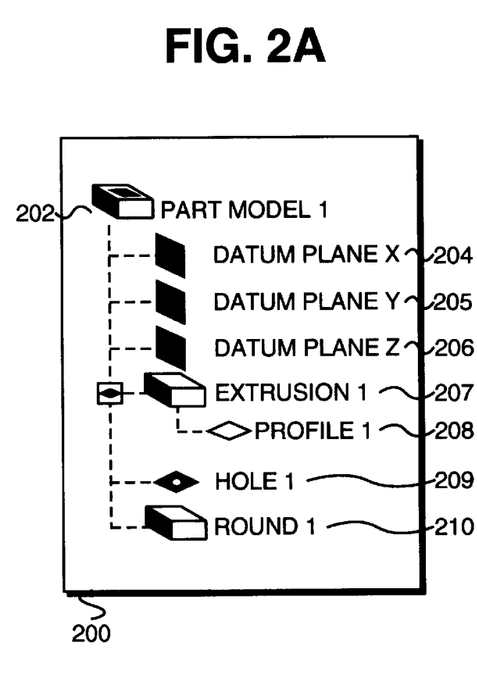
FIGS. 2a, 2b, and 2c are example browser displays illustrating the augmentation of a chronological feature display with logical dependencies according to one embodiment of the present invention.
Figure 2B:
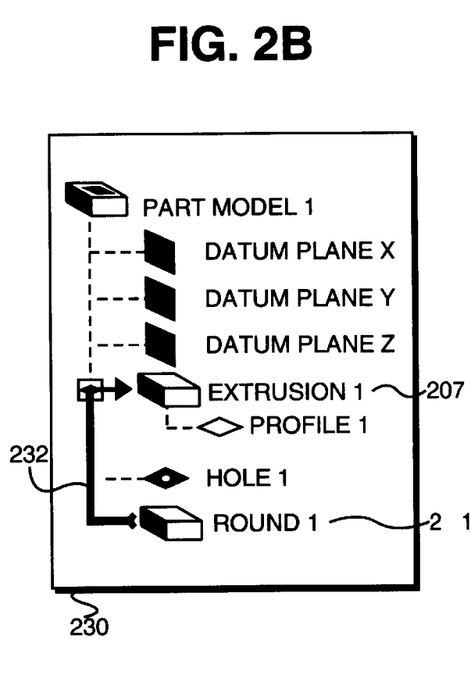
Figure 2C:
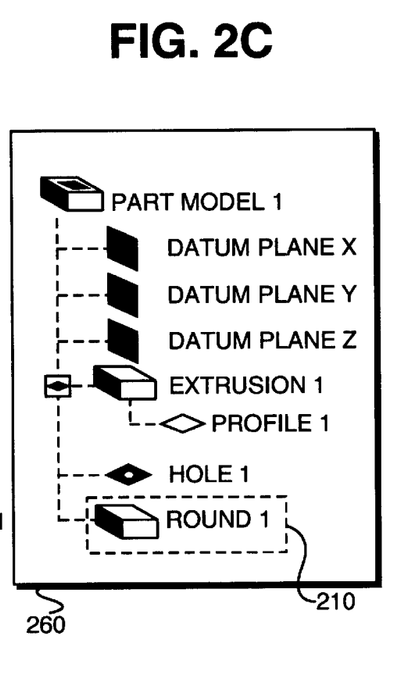

FIGS. 2a, 2b, and 2c are example browser displays illustrating the augmentation of a chronological feature display with logical dependencies according to one embodiment of the present invention. As illustrated in FIG. 2a, a browser display 200 provides a chronological feature display identifying an object 202 and its various features 204–210. The "vertical layout" of the features 204–210 identifies the order in which those features will be displayed when the object is displayed by the CAD application (i.e., the chronological dependencies). For example, feature 204 is displayed prior to feature 205, which in turn is displayed prior to feature 206, etc. The "horizontal layout" of the features 204–210 identifies the hierarchical dependencies of the object. For example, feature 208, which is inset horizontally from feature 207, is part of feature 207.

Figure 3:
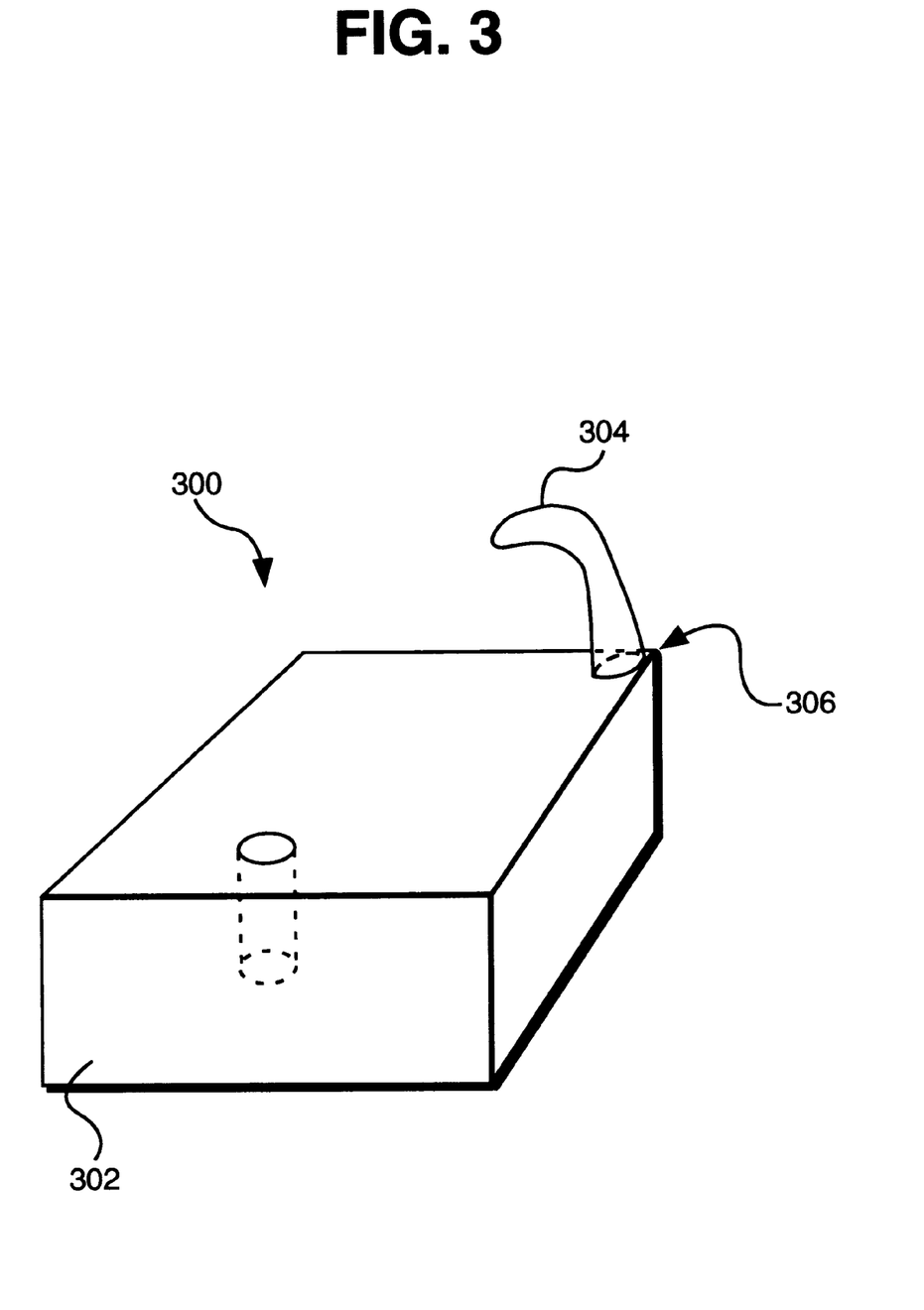
FIG. 3 illustrates a three-dimensional object corresponding to the features of browser displays of FIGS. 2a, 2b, and 2c.

FIG. 3 illustrates a three-dimensional object corresponding to the features of browser display 200. An object 300 (corresponding to object identifier 202) is illustrated with multiple features. For ease of explanation, every feature of object 300 has not been illustrated in browser display 200 of FIG. 2. The feature 204 identifies, for example, surface 302 of object 300. An extrusion 304 (corresponding to feature 207 of FIG. 2a) includes a particular surface characteristic (corresponding to feature 208). The object 300 includes a rounded corner 306 (corresponding to feature 210). Rounded corner 306 is defined to share a parameter with extrusion 304. As illustrated, the arc of rounded corner 306 is shared with a portion of the base of extrusion 304. As these two features share a parameter, there is a logical dependency between the two. During the design of object 300, a user could define extrusion 304 to be dependent on rounded corner 306 so that the portion of the base of extrusion 304 is to have the same arc as rounded corner 306. Conversely, a user could define rounded corner 306 to be dependent on extrusion 304 so that rounded corner 306 is to have the same arc as a portion of the base of extrusion 304.

FIG. 2b illustrates a browser display 230 providing a chronological feature display including the same objects and features as browser display 200. Additionally, browser display 230 illustrates a logical dependency between features 207 and 210 as indicator 232. In the illustrated embodiment, indicator 232 is a directional arrow identifying feature 207 as logically depending from feature 210.

In the illustrated embodiment, logical dependencies are illustrated on a per-feature basis. In other words, the logical dependencies to and/or from a single feature are illustrated at a time. However, in alternate embodiments logical dependencies for two or more features can be illustrated concurrently.

Also in the illustrated embodiment, logical dependencies are displayed by overlaying an indicator on top of the indicators already displayed by the chronological feature display. By way of example, indicator 232 of FIG. 2b is overlaid on top of the dotted line between features 207 and 210 of FIG. 2a. However, in alternate embodiments logical dependencies can be displayed in different manners. For example, the features themselves may be highlighted in a particular manner so that a "depending" feature is displayed in one color while the feature from which it depends is displayed in another color, such as feature 210 being outlined in or changed to a particular color, while feature 207 is outline in or changed to another color. By way of another example, different lines (e.g., arcs) or graphics may be used to display logical dependencies, and such indicators need not be overlaid on top of the dotted lines already provided in the chronological and hierarchical feature display.

FIG. 2c illustrates a browser display 260 including the same object and features as browser display 200. However, in browser display 260 feature 210 is highlighted. This highlighting is used to indicate that feature 210 failed to resolve. Browser control 110 of FIG. 1 receives an input from the solvers of application 100 of which features, if any, failed to resolve. Thus, according to one embodiment, browser control 110 indicates to chronological/hierarchical dependency display control 112 that unresolved features are to be highlighted. It is to be appreciated that this highlighting can be done in any of a wide variety of conventional manners, such as bold facing, underlining, italicizing, color variations, etc.

Figure 4:
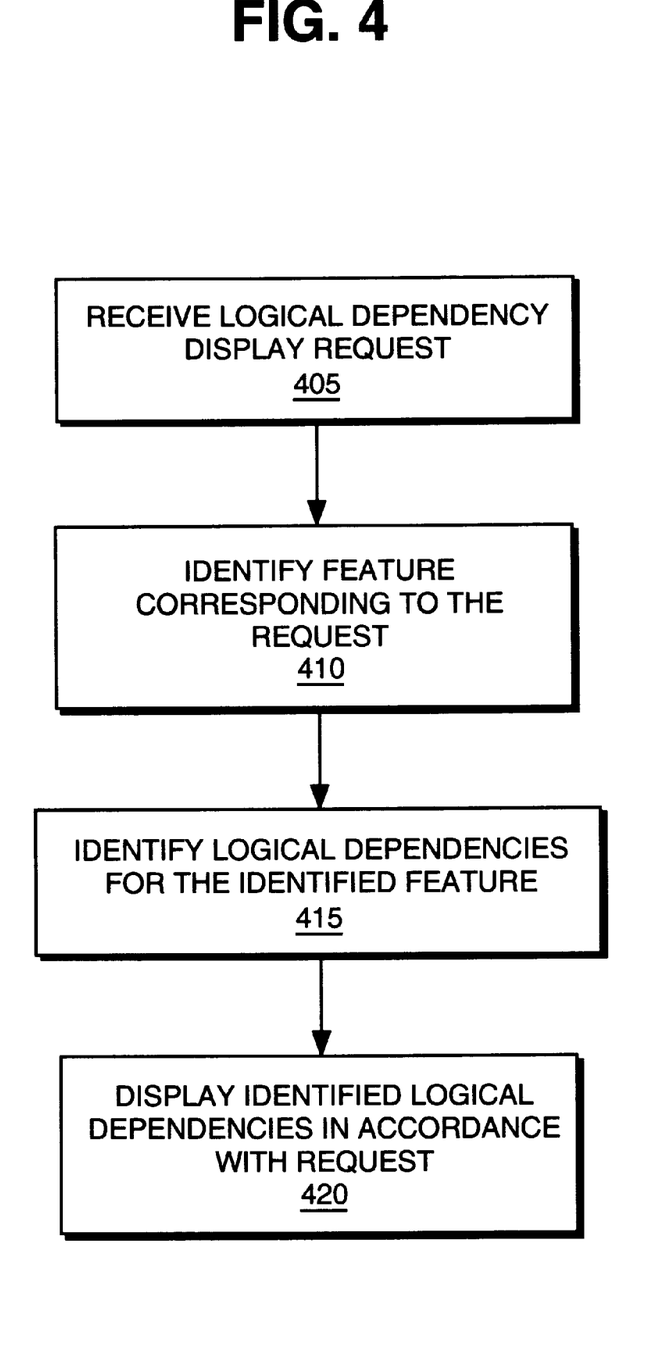
FIG. 4 is a flow chart illustrating the augmenting of a chronological feature browser with logical dependency information according to one embodiment of the present invention.

FIG. 4 is a flow chart illustrating the augmenting of a chronological feature browser with logical dependency information according to one embodiment of the present invention. As illustrated, browser control 110 initially receives a logical dependency display request, block 405. This request can be received from a user, or alternatively from another hardware or software component (such as a macro, a script, or another function of browser control 110). Upon receipt of such a request, logical dependency identification control 114 of FIG. 1 identifies the feature corresponding to the request, block 410. According to one embodiment of the present invention, an indication of the feature corresponding to the request is provided to logical dependency identification control 114 by the same component which provided the request to the identification control 114. For example, if a user requests logical dependency information for feature 210 of FIG. 2a, chronological/hierarchical dependency display control 112 of FIG. 1 provides an indication of the request as well as an indication of feature 210 to logical dependency identification control 114.

It should be noted that a user can request that logical dependency information be displayed for a particular feature in any of a wide variety of conventional manners. By way of example, a user may select a particular feature using a cursor control device and an on-screen pointer, then select a "display logical dependencies" option from a pull down menu, or alternatively, by "right clicking" on the feature and selecting a "display logical dependencies" option.

Logical dependency identification control 114 then identifies the logical dependencies for the feature identified in block 410, block 415. As discussed above, this identification is performed by logical dependency identification control 114 accessing database 105 for logical dependency information corresponding to the particular feature. Upon receipt of logical dependency information corresponding to the identified feature, logical dependency display control 116 displays those logical dependencies in accordance with the original request, block 420. As discussed above, different logical dependencies can be displayed, including all dependencies corresponding to the feature, the features from which the particular feature depends, and those features which depend from the particular feature. In one embodiment, the dependencies to be displayed are indicated as part of a request. For example, a user may be able to select from these three logical dependency variations at the time he or she makes the "display logical dependencies" option selection.

According to one embodiment of the present invention, logical dependency identification control 114 receives from the design application 100 solver(s) an indication of which features, if any, failed to resolve. Additionally, such solvers typically provide an indication of which dependency, frequently a logical dependency, caused the resolution failure. Thus, upon receipt of an indication of which feature failed to resolve as well as which dependency caused the failure, logical dependency identification control 114 passes an indication of the logical dependency, as well as the features corresponding to that dependency, to logical dependency display control 160. For example, in FIG. 2b, if feature 210 failed to resolve due to its logical dependency from feature 207, the solver provides an indication of feature 210 as well as an indication of the dependency of feature 210 on feature 207 to logical dependency identification control 114. Logical dependency identification control 114, in turn, causes logical dependency display control 116 to display the logical dependency indicator 232.

According to one implementation, logical dependency display control 116 displays indicators of logical dependencies differently if the feature fails to resolve. This information can be received from, for example, logical dependency identification control 114. The indicator displays can differ in any of a wide variety of conventional manners, such as by varying colors. According to one implementation, logical dependencies for features which failed to resolve are displayed in red.

By automatically providing indicators of dependencies which caused a feature to not resolve, the present invention advantageously provides additional debugging information to a user. That is, those features which could not be resolved and the dependencies which caused the resolution failure are made readily apparent to the user, thereby allowing the user to more quickly realize and correct the dependency problem.

Figure 5:
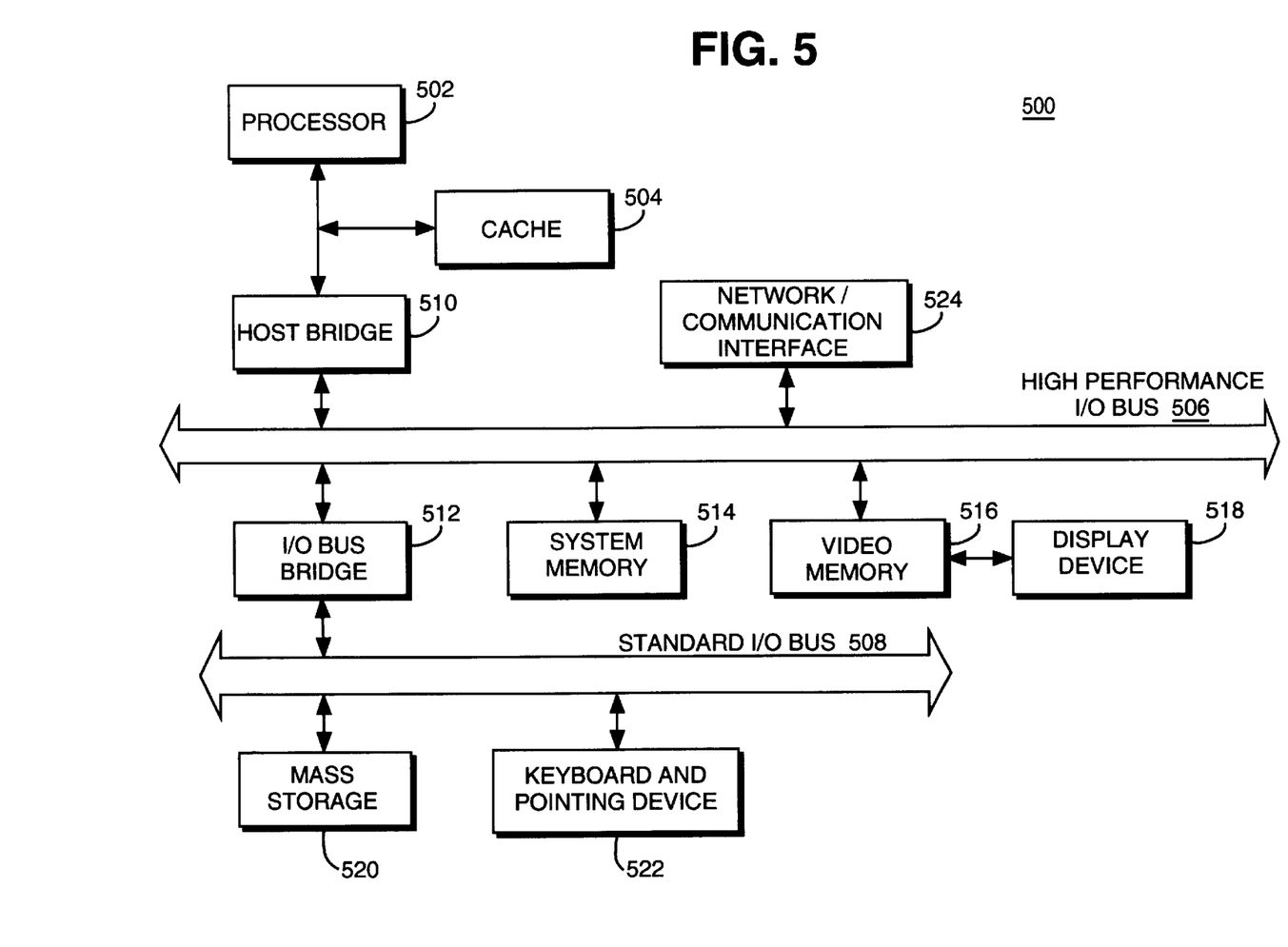
FIG. 5 illustrates an example hardware system or machine suitable for use with one embodiment of the present invention.

FIG. 5 illustrates an example hardware system or machine suitable for use with one embodiment of the present invention. Hardware system 500 includes processor 502 to and cache memory 504 coupled to each other as shown. Additionally, hardware system 500 includes high performance input/output (I/O) bus 506 and standard I/O bus 508. Host bridge 510 couples processor 502 to high performance I/O bus 506, whereas I/O bus bridge 512 couples the two buses 506 and 508 to each other. Coupled to bus 506 are network/communication interface 524, system memory 514, and video memory 516. In turn, display device 518 is coupled to video memory 516. Coupled to bus 508 is mass storage 520, keyboard and pointing device 522, and I/O ports 526. Collectively, these elements are intended to represent a broad category of hardware systems, including but not limited to general purpose computer systems based on processors available from Intel Corporation of Santa Clara, Calif., from Advance Micro Devices (AMD) of Sunnyvale, Calif., from National Semiconductor of Sunnyvale, Calif., or from Digital Equipment Corporation (DEC) of Maynard, Mass.

These elements 502–524 perform their conventional functions known in the art. In particular, network/communication interface 524 is used to provide communication between system 500 and any of a wide range of conventional networks, such as an Ethernet, token ring, the Internet, etc. It is to be appreciated that the circuitry of interface 524 is dependent on the type of network the system 500 is being coupled to.

Mass storage 520 is used to provide permanent storage for the data and programming instructions to implement the above described functions, whereas system memory 514 is used to provide temporary storage for the data and programming instructions when executed by processor 502. I/O ports 526 are one or more serial and/or parallel communication ports used to provide communication between additional peripheral devices which may be coupled to hardware system 500.

It is to be appreciated that various components of hardware system 500 may be re-arranged. For example, cache 504 may be on-chip with processor 502. Alternatively, cache 504 and processor 502 may be packed together as a "processor module", with processor 502 being referred to as the "processor core". Furthermore, certain implementations of the present invention may not require nor include all of the above components. For example, mass storage 520, keyboard and pointing device 522, and/or display device 518 and video memory 516 may not be included in system 500. Additionally, the peripheral devices shown coupled to standard I/O bus 508 may be coupled to high performance I/O bus 506; in addition, in some implementations only a single bus may exist with the components of hardware system 500 being coupled to the single bus. Furthermore, additional components may be included in system 500, such as additional processors, storage devices, or memories.

In one embodiment, the logical dependency identification and display according to the present invention as discussed above is implemented as a series of software routines run by hardware system 500 of FIG. 5. In this embodiment, browser control 110 of FIG. 1 is implemented as a series of software routines. These software routines comprise a plurality or series of instructions to be executed by a processor in a hardware system, such as processor 502 of FIG. 5. Initially, the series of instructions are stored on a storage device, such as mass storage 520. It is to be appreciated that the series of instructions can be stored using any conventional storage medium, such as a diskette, CD-ROM, magnetic tape, digital versatile disk (DVD), laser disk, ROM, Flash memory, etc. It is also to be appreciated that the series of instructions need not be stored locally, and could be received from a remote storage device, such as a server on a network, via network/communication interface 524. The instructions are copied from the storage device, such as mass storage 520, into memory 514 and then accessed and executed by processor 502. In one implementation, these software routines are written in the C++ programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with the above described functions of the present invention. By way of another example, portions of mechanical design application 100 and/or browser control 110 of FIG. 1 could be implemented in one or more ASICs of an additional circuit board for insertion into hardware system 500 of FIG. 5.

Figure 6:
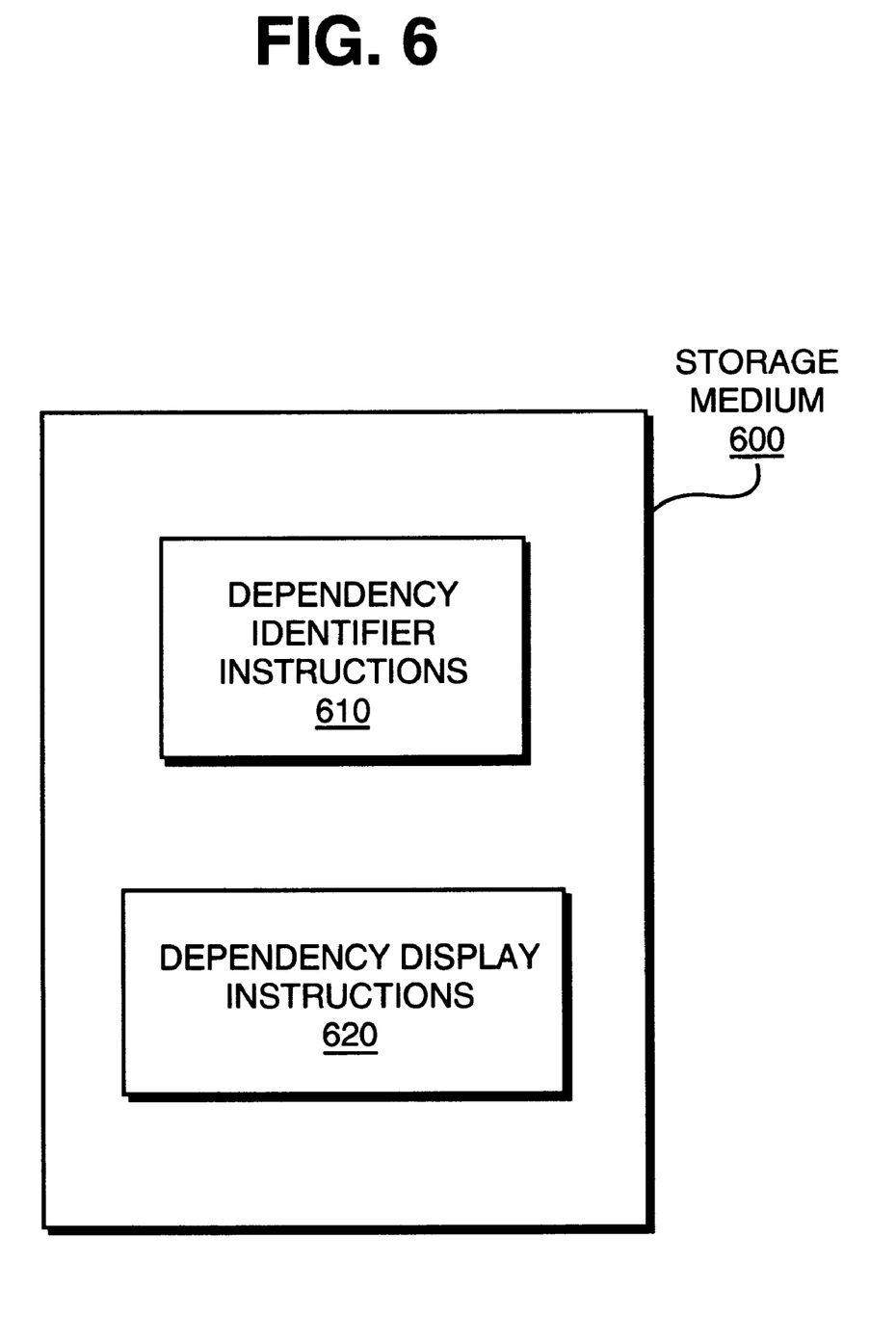
FIG. 6 illustrates a storage medium which may store instructions for carrying out the present invention according to one embodiment of the present invention.

FIG. 6 illustrates a storage medium which may store instructions for carrying out the present invention according to one embodiment of the present invention. A storage medium 600 is illustrated, including dependency identification instructions 610 and dependency display instructions 620. Storage medium 600 is intended to represent a wide variety of conventional storage media which may be used to store software instructions. Examples of such storage media include magnetic disks, CD-ROMs, digital versatile disks (DVD), random access memories, Flash or other read-only memories, etc. Dependency identification instructions 610 include the instructions, to be executed by a processor, for carrying out the process of identifying logical dependencies, whereas dependency display instructions 620 include the instructions, to be executed by a processor, for carrying out the process of providing a display of logical dependencies.

According to alternate embodiments of the present invention additional information can also be encoded in the logical dependency indicators. The exact nature of such additional information is dependent on the particular dependency and dependency information stored in database 105 of FIG. 1. By way example, a dependency may have additional "type", name, or other descriptive information. This additional information is retrieved by logical dependency identification control 114 and provided to logical dependency display control 160. Logical dependency display control 116, in turn, is pre-programmed with particular encodings for this additional information. The encoding can be carried out in any wide variety conventional manners, such as color variations, line width, line type (for example, dashed, dotted, solid, etc.), etc.

Thus, an enhanced chronological feature browser for computer aided design has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method for indicating dependencies among features of an object, the method comprising:

identifying a feature of the object for which a logical dependency is to be displayed; and augmenting a chronological feature display with an indicator of the logical dependency, wherein the augmenting comprises overlaying the indicator of the logical dependency on indicators of the chronological feature display.

2. The method of claim 1, further comprising:

identifying all logical dependencies corresponding to the feature; and wherein the augmenting further comprises displaying an indicator for each of the logical dependencies corresponding to the feature.

3. The method of claim 1, further comprising:

identifying all other features of the object which depend from the feature; and wherein the augmenting further comprises displaying an indicator for each of the other features of the object which depend from the feature.

4. The method of claim 1, further comprising:

identifying all other features of the object from which the feature depends; and wherein the augmenting further comprises displaying an indicator for each of the other features of the object from which the feature depends.

5. The method of claim 1, wherein the augmenting comprises adding, to the chronological feature display, a directional arrow indicating the logical dependency.

6. The method of claim 1, further comprising:

encoding additional information corresponding to the logical dependency in the indicator.

7. A storage medium having stored therein a plurality of instructions that are machine executable, wherein when executed, the instructions operate to indicate dependencies among features of an object by identifying a feature of the object for which a logical dependency is to be displayed, and augmenting a chronological feature display with an indicator of the logical dependency, wherein the augmenting comprises overlaying the indicator of the logical dependency on indicators of the chronological feature display.

8. The storage medium of claim 7, wherein the instructions further operate to indicate dependencies by identifying all logical dependencies corresponding to the feature, and wherein the augmenting further comprises displaying an indicator for each of the logical dependencies corresponding to the feature.

9. The storage medium of claim 7, wherein the instructions further operate to indicate dependencies by identifying all other features of the object which depend from the feature, and wherein the augmenting further comprises displaying an indicator for each of the other features of the object which depend from the feature.

10. The storage medium of claim 7, wherein the instructions further operate to indicate dependencies by identifying all other features of the object from which the feature depends, and wherein the augmenting further comprises displaying an indicator for each of the features of the object from which the feature depends.

11. The storage medium of claim 7, wherein the augmenting comprises adding, to the chronological feature display, a directional arrow indicating the logical dependency.

12. The storage medium of claim 7, wherein the instructions further operate to indicate dependencies by encoding additional information corresponding to the logical dependency in the indicator.

13. An apparatus comprising:
   logical dependency identification control logic to identify a feature of an object for which a logical dependency is to be displayed; and
   dependency display control logic, coupled to the logical dependency identification control logic, to augment a chronological feature display with an indicator of the logical dependency, wherein the dependency display control logic is operative to overlay the indicator of the logical dependency on indicators of the chronological feature display.

14. The apparatus of claim 13, wherein the logical dependency identification control logic is operative to identify all logical dependencies corresponding to the feature, and wherein the dependency display control logic is further operative to display an indicator for each of the logical dependencies corresponding to the feature.

15. The apparatus of claim 13, wherein the logical dependency identification control logic is operative to identify all other features of the object which depend from the feature, and wherein the dependency display control logic is further operative to display an indicator for each of the other features of the object which depend from the feature.

16. The apparatus of claim 13, wherein the logical dependency identification control logic is operative to identify all other features of the object from which the feature depends, and wherein the dependency display control logic is further operative to display an indicator for each of the other features of the object from which the feature depends.

17. The apparatus of claim 13, wherein the dependency display control logic is operative to add, to the chronological feature display, a directional arrow indicating the logical dependency.

18. The apparatus of claim 13, wherein the dependency display control logic is operative to encode additional information corresponding to the logical dependency in the indicator.

19. An apparatus comprising:
   means for identifying a feature of an object for which a logical dependency is to be displayed; and
   means, coupled to the means for identifying, for augmenting a chronological feature display with an indicator of the logical dependency, wherein the means for augmenting comprises means for overlaying the indicator of the logical dependency on indicators of the chronological feature display.

20. The apparatus of claim 19, further comprising:
   means for identifying all logical dependencies corresponding to the feature; and
   wherein the means for augmenting further comprises means for displaying an indicator for each of the logical dependencies corresponding to the feature.

21. The apparatus of claim 19, further comprising:
   means for identifying all other features of the object which depend from the feature; and
   wherein the means for augmenting further comprises means for displaying an indicator for each of the other features of the object which depend from the feature.

22. The apparatus of claim 19, further comprising:
   means for identifying all other features of the object from which the feature depends; and
   wherein the means for augmenting further comprises means for displaying an indicator for each of the other features of the object from which the feature depends.

* * * * *